United States Patent
Cahill

(10) Patent No.: US 8,423,256 B2
(45) Date of Patent: Apr. 16, 2013

(54) SYSTEMS AND METHODS FOR ADAPTIVE DECELERATION

(75) Inventor: Eric D. Cahill, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 625 days.

(21) Appl. No.: 12/646,475

(22) Filed: Dec. 23, 2009

(65) Prior Publication Data

US 2011/0153176 A1    Jun. 23, 2011

(51) Int. Cl.
*G06F 19/00*    (2011.01)

(52) U.S. Cl.
USPC .......................................... 701/70; 303/126

(58) Field of Classification Search ............ 701/70; 303/121, 126
See application file for complete search history.

(56) References Cited

U.S. PATENT DOCUMENTS

| | | | | |
|---|---|---|---|---|
| 4,610,484 A * | 9/1986 | Amberg et al. | ........... | 303/113.4 |
| 5,350,225 A * | 9/1994 | Steiner et al. | ........... | 303/113.4 |
| 5,496,098 A * | 3/1996 | Brearley | .................. | 303/22.2 |
| 5,590,937 A * | 1/1997 | Heibel | ................... | 303/125 |
| 6,223,114 B1 * | 4/2001 | Boros et al. | ........... | 701/70 |
| 6,293,632 B1 * | 9/2001 | Grote et al. | ........... | 303/112 |
| 6,450,588 B2 * | 9/2002 | Grote et al. | ........... | 303/112 |
| 6,890,041 B1 * | 5/2005 | Ribbens et al. | ........... | 303/126 |
| 7,015,805 B2 * | 3/2006 | Knoop et al. | ........... | 340/467 |
| 7,117,716 B2 * | 10/2006 | Neubert et al. | ........... | 73/9 |
| 7,717,527 B1 * | 5/2010 | Griffith | ........... | 303/126 |
| 7,784,882 B2 * | 8/2010 | Griffith | ........... | 303/126 |
| 7,901,014 B2 * | 3/2011 | Miller et al. | ........... | 303/191 |
| 8,029,074 B2 * | 10/2011 | Cahill | ........... | 303/122.03 |
| 8,102,280 B2 * | 1/2012 | Cahill | ........... | 340/960 |
| 8,180,548 B2 * | 5/2012 | Cahill | ........... | 701/79 |
| 8,197,016 B2 * | 6/2012 | Metzger, Jr. | ........... | 303/155 |
| 8,214,121 B2 * | 7/2012 | Cahill | ........... | 701/70 |
| 2006/0243857 A1 | 11/2006 | Rado | | |
| 2008/0073970 A1 * | 3/2008 | Griffith | ........... | 303/152 |
| 2010/0057320 A1 * | 3/2010 | Whittingham | ........... | 701/70 |
| 2010/0106347 A1 * | 4/2010 | Cahill | ........... | 701/3 |
| 2010/0109429 A1 * | 5/2010 | Griffith | ........... | 303/121 |
| 2010/0274457 A1 * | 10/2010 | Cahill | ........... | 701/70 |
| 2010/0286880 A1 * | 11/2010 | Cahill et al. | ........... | 701/70 |
| 2011/0125381 A1 * | 5/2011 | Szell et al. | ........... | 701/70 |
| 2011/0130935 A1 * | 6/2011 | Krueger et al. | ........... | 701/70 |

FOREIGN PATENT DOCUMENTS

WO    2005/087563    9/2005

OTHER PUBLICATIONS

Patent Act 1977: Combined Search and Examination Report under Sections 17 and 18(3) dated Feb. 11, 2011.

* cited by examiner

*Primary Examiner* — Russell Frejd
(74) *Attorney, Agent, or Firm* — Snell & Wilmer L.L.P.

(57) ABSTRACT

Systems and methods for adaptive deceleration are disclosed. A brake system controller may perform a method comprising receiving a pedal deflection signal comprising a pedal deflection level, determining a present level of deceleration, and mapping the pedal deflection level to a desired level of deceleration, wherein the desired level of deceleration is greater than the present level of deceleration.

20 Claims, 2 Drawing Sheets

SYSTEMS AND METHODS FOR ADAPTIVE DECELERATION

FIELD OF INVENTION

The present invention relates to systems and methods for adaptive deceleration.

BACKGROUND

In a standard aircraft having a pilot and co-pilot, there are typically four brake pedals. Each of the pilot and co-pilot has two brake pedals. For the pilot, the left brake pedal controls the brakes on the left side of the aircraft, and the right brake pedal controls the brakes on the right side of the aircraft. The left and right brake pedals are configured similarly for the co-pilot.

Conventionally, brake pedal deflection (i.e., the magnitude the pedal is deflected relative to its starting, or "at rest" position) corresponds to the braking force applied at the aircraft brake. Typically, the greater the pedal deflection, the greater the amount of force applied by the aircraft brake(s).

In more modern aircraft, brake pedal deflection corresponds to a desired amount of aircraft deceleration, hereinafter referred to as "deceleration command braking." In these systems, the greater the pedal deflection, the greater the amount of deceleration is desired for the aircraft (also referred to as "desired deceleration"). Such systems measure aircraft deceleration and brake deflection and then calculate the desired deceleration amount. Then, the braking system commands an amount of force at the aircraft brake(s) to achieve the desired level of deceleration. These modern systems allow for more accurate and granular pilot control, thus enhancing safety, braking control, and improving braking maneuvers (e.g., landing and rejected take-offs ("RTO")).

However, in conventional deceleration command braking, the braking system uses a static mapping of pedal deflection to target deceleration. This is problematic in several ways. For example, during landing, the aircraft is likely already decelerating due to a variety of factors, such as reverse engine thrust, air resistance, and wing flap position. Such other factors cause deceleration unrelated to the force applied at the aircraft brake, which may contribute to "ambient deceleration," which as used herein refers to the deceleration of an aircraft at a given time. Accordingly, in such conventional systems where aircraft deceleration is already present due to one or more of these factors, as pedal deflection begins, the braking system commands no braking force (i.e., a braking force of 0). It is only when pedal deflection exceeds the ambient deceleration that the braking system will command the application of force at the aircraft brake. In such a scenario, it is feasible that a pilot may deflect the pedal up to 40% prior to activating the aircraft brake.

Accordingly, there is a need for alternate methods and systems for aircraft braking in a deceleration command braking configuration.

SUMMARY

In various embodiments, a method comprises receiving (at a brake system controller) a pedal deflection signal comprising a pedal deflection level, determining (at the brake system controller) a present level of deceleration, and mapping (at the brake system controller) the pedal deflection level to a desired level of deceleration, wherein the desired level of deceleration is greater than the present level of deceleration.

In various embodiments, a system comprises a brake system controller in electrical communication with a deceleration detection system, and a pedal deflection detection system in electrical communication with the brake system controller. The pedal deflection detection system generates a pedal deflection signal responsive to deflection of a pedal. The deceleration detection system generates a present deceleration signal corresponding to a deceleration of an aircraft. The brake system controller receives the pedal deflection signal and the present deceleration signal. The brake system controller determines a desired level of deceleration, based upon the pedal deflection signal and the present deceleration signal, wherein the desired level of deceleration has a value greater than the value of the present deceleration signal.

DETAILED DESCRIPTION

Figure 1:
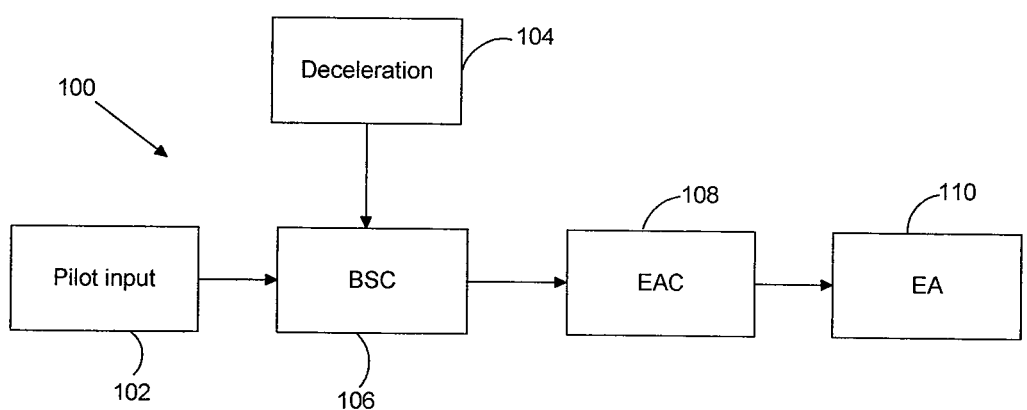
FIG. 1 illustrates exemplary components of a braking system.

The detailed description of exemplary embodiments herein makes reference to the accompanying drawings, which show exemplary embodiments by way of illustration and its best mode. While these exemplary embodiments are described in sufficient detail to enable those skilled in the art to practice the invention, it should be understood that other embodiments may be realized and that logical, chemical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are disclosed herein that provide for adaptive deceleration of an aircraft responsive to pilot command. In accordance with various embodiments, by adapting deceleration to present aircraft conditions, a pilot may have improved control over braking. The systems and methods disclosed herein are suitable for use with various aircraft braking systems, although there may be utility for use with other braking systems.

In conventional deceleration command braking systems, during landing, an aircraft's ambient deceleration may not directly correlate to the amount of desired deceleration. As a result, a conventional braking system may interpret a 20% brake pedal deflection as calling for x m/s$^2$ of deceleration. However, because the ambient deceleration may be at or above x m/s$^2$, the braking system may not apply any braking.

In such a situation, a pilot may confuse this for a braking system malfunction. In conventional systems, braking is not applied until the brake pedal is deflected to an amount that correlates or maps to an amount that exceeds the ambient deceleration. In many scenarios, this means brake pedal deflection of 30% or 40% is needed prior to the application of braking. Such a "lag" from first pedal deflection to the first application of braking is frustrating to pilots and may lead to unsafe situations.

However, as it has been presently found, adaptive braking may use an aircraft's ambient deceleration as a baseline for the application of braking. Accordingly, by using the ambient deceleration in determining the amount of braking to be applied, a braking system may begin braking sooner, if not immediately, in response to brake pedal deflection, improving landing safety, distance, and pilot comfort.

With reference to FIG. 1, aircraft braking systems typically include at least one brake system controller 106 and, frequently, at least two brake system controllers may be used for redundancy purposes. Brake system controller 106 is in communication with various components that relay pilot input 102 to brake system controller 106. For example, pilot input 102 may comprise a signal produced by one or more aircraft brake indicators.

An aircraft brake indicator may be any device that allows a pilot to input braking commands. For example, an aircraft brake indicator may be one or more aircraft brake pedals. A typical aircraft may have two brake pedals for the pilot and two brake pedals for the first officer, although any configuration is contemplated for use with the systems and methods provided herein. A brake pedal may have a starting position and a terminal position. A starting position may comprise the position of the pedal when no pressure is applied. Pedal deflection may be measured as a percentage of deflection from the starting position. Thus, pedal deflection at the starting position is about 0.

A terminal position may comprise the farthest deflection point possible for a given brake pedal. For example, the terminal position may exist when pedal deflection is about 100%. Pilot input 102 may comprise the amount of pedal deflection for one or more aircraft brake pedals. Aircraft brake pedals may send pilot input 102 to brake system controller 106 electronically, although pilot input 102 may also be relayed to brake system controller 106 mechanically, or through a combination thereof.

Brake system controller 106 may be configured to provide an input/output interface ("I/O" interface) to other components of an aircraft braking system. For example, brake system controller 106 may be in communication (such as electrical communication) with components in a cockpit of the aircraft (e.g., an aircraft brake pedal) and/or other portions of an aircraft braking system, such as electromechanical actuator controller 108. Such communication may be provided by, for example, a bus or network. In addition, brake system controller 106 may contain a computing device (e.g., a processor) and an associated memory. The associated memory may contain executable code for performing braking control. The associated memory may comprise an article of manufacture including a computer-readable medium having instructions stored thereon that, if executed by a computing device (e.g., a processor), cause the computing device to perform various methods.

Brake system controller 106 may comprise various predetermined correlations, mappings, or other associations of brake pedal deflection to a desired level of deceleration. For example, brake system controller 106 may have a table or other form of data set to convert a received brake pedal deflection (such as a brake pedal deflection percentage) to a desired level of deceleration.

As noted above, in an embodiment, with reference to FIG. 1, a brake system controller may be in communication with one or more electromechanical actuator controllers. For example, brake system controller 106 may be in communication with electromechanical actuator controller 108. An electromechanical actuator controller, such as electromechanical actuator controller 108, may contain a computing device (e.g., a processor) and an associated memory. The associated memory may comprise an article of manufacture including a computer-readable medium having instructions stored thereon that, if executed by a computing device (e.g., a processor), cause the computing device to perform various methods. The associated memory may contain executable code for converting braking commands into a motor current command. An electromechanical actuator controller, such as electromechanical actuator controller 108, may provide a drive signal to one or more electromechanical actuators, such as electromechanical actuator 110, of an aircraft brake to drive an electromechanical actuator to a commanded position. Thus, electromechanical actuator 110 may apply braking force directly.

In various embodiments, brake system controller 106 may communicate with electromechanical actuator controller 108 by sending a command signal to electromechanical actuator controller 108. The command signal may contain one or more commands. For example, in various embodiments, the command signal may command a certain amount of force be applied by the electromechanical actuators. Thus in such embodiments, brake system controller 106 is able to map, correlate, or associate a desired deceleration to an amount of force necessary to achieve that deceleration. Accordingly, brake system controller 106 may contain various information pertaining to an aircraft, such as weight, make, model, and aircraft brake system configuration to assist in making this determination.

Additionally, in various embodiments, the command signal may command a particular aircraft deceleration that is achieved by commanding a certain amount of force be applied by the electromechanical actuators. In such embodiments, the electromechanical actuator controller is able to map, correlate, or associate a desired deceleration to an amount of force necessary to achieve that deceleration.

In various embodiments, an aircraft may also comprise a variety of devices that measure aircraft acceleration/deceleration. For example, the aircraft may comprise various deceleration detection systems. In various embodiments, a deceleration detection system may monitor wheel rotation. For example, in an embodiment, a deceleration detection system may determine how many radians have elapsed over a given time period. From this information, the deceleration detection system may derive velocity. A deceleration detection system may thus derive the difference in velocity over a given time. From this information, the deceleration detection system may derive acceleration. In further embodiments, a deceleration detection system may comprise an accelerometer.

Thus, with reference to FIG. 1, aircraft deceleration information 104 (e.g., various deceleration values) is available to brake system controller 106. As used herein, deceleration values are given as positive values to represent deceleration and negative values to represent acceleration. For example, aircraft acceleration (i.e., aircraft negative deceleration) occurs when the aircraft is accelerating in a forward direction, such as during takeoff. Aircraft deceleration occurs when an aircraft is accelerating in a backward direction, such as during landing.

As mentioned above, in braking systems where pilot input is associated with an aircraft deceleration, adaptive braking may be used to account for the ambient deceleration. In various embodiments, this may occur by setting a baseline deceleration value to the value of the ambient deceleration. In this manner, braking may be commanded as soon as the brake pedal is deflected, eliminating the "lag" effect discussed above that plagues conventional system.

Figure 2:
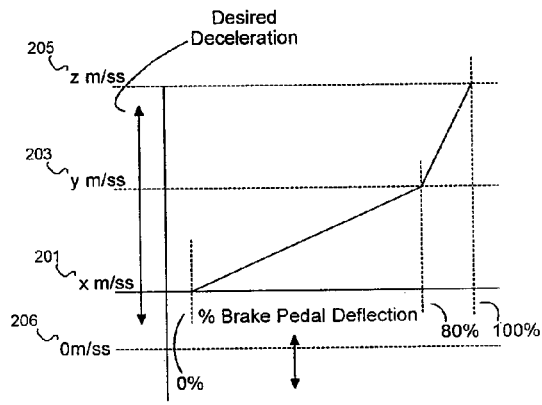
FIG. 2 illustrates an exemplary embodiment of adaptive deceleration.

For example, with reference now to FIG. 2, a relationship between brake pedal deflection and a desired level of deceleration is illustrated. In FIG. 2, brake pedal deflection percentage is shown on the x axis and desired deceleration is shown on the y axis. In accordance with various embodiments, when brake pedal deflection begins (i.e., when brake pedal deflection becomes nonzero), the level of ambient deceleration is determined. Once the level of ambient deceleration is determined, baseline value 201 (shown as x m/s$^2$) may be set to the value of the ambient deceleration, provided the ambient deceleration is above 0 (shown as 0 value 206). A baseline value, such as baseline value 201, comprises the value of deceleration at the time brake pedal deflection transitions from 0 to a nonzero value. Further, consistent with the descriptions herein, a baseline value, such as baseline value 201, comprises the value of desired deceleration when pedal deflection is a nearly infinitesimal amount above 0%. A predetermined relationship between pedal deflection and desired deceleration may then be used to map, correlate, or otherwise associate brake pedal deflection percentage to desired deceleration.

For example, with continued reference to FIG. 2, a linear relationship having a first slope is shown between 0% and 80% pedal deflection, with transition deceleration value 203 (shown as y m/s$^2$) correlated to 80% pedal deflection. Also for example, a linear relationship having a second slope is shown between 80% and 100% pedal deflection, with maximum deceleration value 205 (shown as z m/s$^2$) correlated to 100% pedal deflection. However, any combination of relationships between pedal deflection and desired deceleration may be used.

Figure 3:
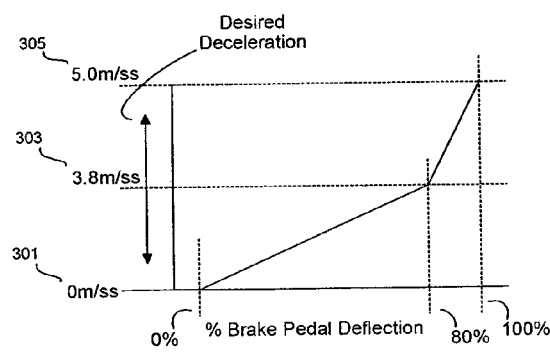
FIG. 3 illustrates a mapping of pedal deflection to deceleration where ambient deceleration is 0 or less.

There are scenarios where a pilot may desire aircraft deceleration in response to the aircraft being in a negative deceleration state. For example, during an RTO, an aircraft as a negative deceleration, but the pilot may indicate a desire to apply braking by deflecting the brake pedal. In this scenario, among others, for example and with reference to FIG. 3, a relationship between brake pedal deflection and a desired level of deceleration is illustrated where ambient deceleration is 0 (or, alternatively, has a negative value). In FIG. 3, brake pedal deflection percentage is shown on the x axis and desired deceleration is shown on the y axis. In various embodiments, when ambient deceleration is 0 or has a negative value at the time brake pedal deflection begins, baseline value 301 is set to 0. A predetermined relationship between pedal deflection and desired deceleration may then be used to map, correlate, or otherwise associate brake pedal deflection percentage to desired deceleration.

For example, a linear relationship having a first slope is shown between 0% and 80% pedal deflection, with transition deceleration value 303 (shown as 3.8 m/s$^2$, for example) correlated to 80% pedal deflection. Also for example, a linear relationship having a second slope is shown between 80% and 100% pedal deflection, with maximum deceleration value 305 (shown as 5 m/s$^2$, for example) correlated to 100% pedal deflection. However, any combination of relationships between pedal deflection and desired deceleration may be used.

Figure 4:
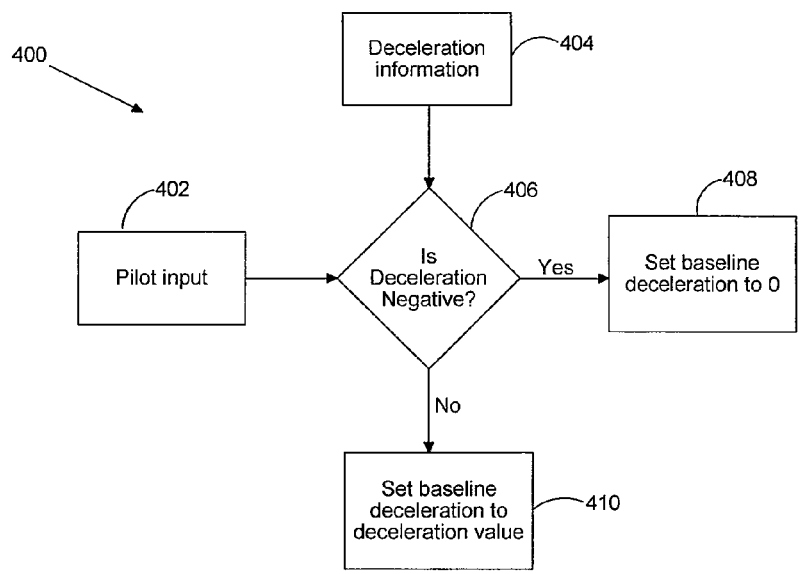
FIG. 4 illustrates an adaptive mapping of pedal deflection to deceleration in accordance with an exemplary embodiment.

With reference to FIG. 4, an exemplary embodiment is illustrated. When a pilot desires braking, the pilot provides pilot input 402. Pilot input 402 may comprise, for example, depressing an aircraft brake pedal to a given level of deflection. The level of deflection is thus communicated as pilot input 402 to a brake system controller.

A brake system controller may be configured to receive pilot input 402, determine the desired level of deceleration associated with pilot input 402, and command other components of the braking system (such as an electromechanical actuator controller) to achieve that desired level of deceleration. For example, a brake system controller may receive pilot input 402 comprising a percentage of brake pedal deflection. The brake system controller may then adjust for ambient deceleration using adaptive braking and then command an electromechanical actuator control to command an electromechanical actuator to apply an amount of force that would achieve that desired level of deceleration.

A brake system controller may obtain deceleration information 404 responsive to pilot input 402. In various embodiments, deceleration information 404 is derived from one or more components of an aircraft that measure deceleration. Deceleration information comprises a deceleration value representative of aircraft deceleration and, accordingly, is equal to ambient deceleration. For example, deceleration information 404 may be measured in ft/s$^2$, m/s$^2$, or any other suitable unit of measure for deceleration.

In response to receipt of deceleration information 404, a brake system controller may then determine if deceleration information 404 has a negative value, as illustrated by decision point 406. If deceleration information 404 has a negative value, such as during a RTO, a brake system controller may set a baseline deceleration value to 0 as shown in end point 408. As shown in FIG. 3, where a baseline deceleration value is set to 0, one or more relationships may be defined to map, correlate, or otherwise associate brake pedal deflection percentage to desired deceleration. The brake system controller may then command other components to achieve that desired deceleration.

If deceleration information 404 has a positive value, a brake system controller may set a baseline deceleration value to the value of deceleration information 404 as shown in end point 410. As shown in FIG. 2, where a baseline deceleration value is set to the ambient deceleration value, one or more relationships may be defined to map, correlate, or otherwise associate brake pedal deflection percentage to desired deceleration. The brake system controller may then command other components to achieve that desired deceleration.

In various embodiments, when pedal deflection returns to 0%, the baseline value is released from a memory. Thus, in various embodiments, when pedal deflection returns to 0% from a nonzero value and then increases above 0%, a new ambient deceleration measurement may be taken and a new baseline value may be determined.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash memory, ROM, and/or the like.

The systems and methods are described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, may be implemented by computer program instructions.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
    receiving, at a brake system controller, a pedal deflection signal comprising a pedal deflection level;
    determining, at the brake system controller, a present level of deceleration;
    mapping, at the brake system controller, the pedal deflection level to a desired level of deceleration,
    wherein the desired level of deceleration is greater than the present level of deceleration.

2. The method of claim 1, further comprising commanding, from the brake system controller, a level of braking from a brake sufficient to achieve the desired level of deceleration.

3. The method of claim 2, wherein the mapping further comprises determining, at the brake system controller, if the present level of deceleration comprises a negative value.

4. The method of claim 3, wherein the mapping comprises a first linear relationship between the pedal deflection level and the desired level of deceleration in response to the pedal deflection level being between 0% and 80%.

5. The method of claim 4, wherein the mapping comprises a second linear relationship between the pedal deflection level and the desired level of deceleration when the pedal deflection level is between 80% and 100%.

6. The method of claim 5, wherein a slope of the first linear relationship is less than a slope of the second linear relationship.

7. The method of claim 3, wherein said mapping further comprises resetting the value of the present level of deceleration to 0, when the present level of deceleration comprises a negative value.

8. A system comprising:
    a brake system controller, in electrical communication with a deceleration detection system; and
    a pedal deflection detection system in electrical communication with the brake system controller,
    wherein the pedal deflection detection system generates a pedal deflection signal responsive to deflection of a pedal,
    wherein the deceleration detection system generates a present deceleration signal corresponding to a deceleration of an aircraft;
    wherein the brake system controller receives the pedal deflection signal and the present deceleration signal,
    wherein the brake system controller determines a desired level of deceleration based upon the pedal deflection signal and the present deceleration signal,
    wherein the desired level of deceleration has a value greater than the value of the present deceleration signal.

9. The system of claim 8, wherein the brake system controller commands an aircraft brake to apply a level of braking sufficient to achieve the desired level of deceleration.

10. The system of claim 8, wherein the brake system controller determines if the present deceleration signal comprises a negative value.

11. The system of claim 10, wherein the brake system controller resets the value of the present deceleration signal to 0, in response to the present deceleration signal comprising a negative value.

12. The system of claim 8, wherein the brake system controller applies a first linear relationship between the pedal deflection signal and the desired level of deceleration, in response to the desired brake signal being between 0% and 80%.

13. The system of claim 8, wherein the brake system controller applies a second linear relationship between the pedal deflection signal and the desired level of deceleration, in response to the desired brake signal being between 80% and 100%.

14. An article of manufacture including a non-transitory computer readable medium having instructions stored thereon that, if executed by a computing device, cause the computing device to perform a method comprising:
    receiving, at a brake system controller, a pedal deflection signal comprising a pedal deflection level;
    determining, at the brake system controller, a present level of deceleration; and
    mapping, at the brake system controller, the pedal deflection level to a desired level of deceleration,
    wherein the desired level of deceleration is greater than the present level of deceleration.

15. The article of manufacture of claim 14, further comprising commanding, from the brake system controller, a level of braking from a brake sufficient to achieve the desired level of deceleration.

16. The article of manufacture of claim 14, wherein the mapping further comprises determining, at the brake system controller, if the present level of deceleration comprises a negative value.

17. The article of manufacture of claim 14, wherein the mapping further comprises a first linear relationship between the pedal deflection level and the desired level of deceleration in response to the pedal deflection level being between 0% and 80%.

18. The article of manufacture of claim 14, wherein the mapping further comprises a second linear relationship between the pedal deflection level and the desired level of deceleration, in response to the pedal deflection level being between 80% and 100%.

19. The article of manufacture of claim 14, further comprising a slope of the first linear relationship less than a slope of the second linear relationship.

20. The article of manufacture of claim 14, wherein the mapping further comprises resetting the value of the present level of deceleration to 0 in response to the present level of deceleration comprising a negative value.

* * * * *